US012320937B2

(12) United States Patent
Ratcliffe et al.

(10) Patent No.: US 12,320,937 B2
(45) Date of Patent: Jun. 3, 2025

(54) FULL-WAVEFORM INVERSION WITH ELASTIC MITIGATION USING ACOUSTIC ANISOTROPY

(71) Applicant: CGG SERVICES SAS, Massy (FR)

(72) Inventors: Andrew Ratcliffe, Henfield (GB); Cris Henstock, Oslo (NO); Wenlei Gao, Crawley (GB); Nabil Masmoudi, Crawley (GB)

(73) Assignee: CGG SERVICES SAS, Massy (FR)

( * ) Notice: Subject to any disclaimer, the term of this patent is extended or adjusted under 35 U.S.C. 154(b) by 559 days.

(21) Appl. No.: 17/734,322

(22) Filed: May 2, 2022

(65) Prior Publication Data

US 2023/0350089 A1     Nov. 2, 2023

(51) Int. Cl.
*G01V 1/30*     (2006.01)
*G01V 1/28*     (2006.01)

(52) U.S. Cl.
CPC ............... *G01V 1/30* (2013.01); *G01V 1/282* (2013.01); *G01V 2210/65* (2013.01)

(58) Field of Classification Search
CPC ...... G01V 1/30; G01V 1/282; G01V 2210/65; G01V 1/303; G01V 2210/614; G01V 1/28; G01V 2210/67; G01V 2210/675; G01V 2210/42

See application file for complete search history.

(56) References Cited

U.S. PATENT DOCUMENTS

| | | | | |
|---|---|---|---|---|
| 2018/0120464 A1* | 5/2018 | Sun | ............... | G01V 1/282 |
| 2019/0187312 A1* | 6/2019 | Ramox-Martinez | ............... | G01V 1/3843 |
| 2019/0302290 A1* | 10/2019 | Alwon | ............... | G01V 1/364 |
| 2021/0063590 A1* | 3/2021 | Cooper | ............... | G01V 1/34 |

FOREIGN PATENT DOCUMENTS

| | | | | |
|---|---|---|---|---|
| AU | 2011224165 A1 * | 9/2012 | ............... | G01V 1/24 |
| NO | 20110375 A1 * | 4/2011 | ............... | G06F 19/00 |

OTHER PUBLICATIONS

English machine-translation of Tang et al. in Foreign Patent Document No. 20110375 A1 (Year: 2011).*
Elapavuluri et al., Estimation of Thomsenis anisotropy parameter δ and ϵ using EO gathers, 2002, Crewes Research Report, vol. 14, pp. 1-18 (Year: 2002).*
Berryman et al., Analysis of Thomsen parameters for finely layered VTI media, Dec. 24, 2001, Geophysical Prospecting, vol. 47, Issue 6, pp. 959 (Abstract): https://doi.org/10.1046/j.1365-2478.1999.00163.x (Year: 2001).*

(Continued)

*Primary Examiner* — Mi'schita' Henson
(74) *Attorney, Agent, or Firm* — PATENT PORTFOLIO BUILDERS PLLC (57) ABSTRACT

Seismic data is processed using a full-waveform inversion using a model with a pseudo-δ layer. The presence of the pseudo-δ layer in the model enables handing the difference at the water bottom between acoustically generated synthetic data and seismic data that corresponds to an elastic medium. The pseudo-δ layer may be less than 100 m thick and/or may be located directly underneath the water bottom. The pseudo-δ layer may have a negative value for δ and a null value for ϵ (δ and ϵ being Thomsen's anisotropy parameters).

18 Claims, 9 Drawing Sheets

(56) References Cited

OTHER PUBLICATIONS

P. F. Daley et al., "Reflection and Transmission Coefficients for Transversely Isotropic Media," Bulletin of the Seismological Society of America, Jun. 1977, vol. 67, No. 3, pp. 661-675.

Search Report in corresponding/related British Application No. GB2212392.1 dated Feb. 15, 2023.

Y. Gholami et al., "Acoustic VTI full waveform inversion: sensitivity analysis and realistic synthetic examples," SEG San Antonio 2011 Annual Meeting, pp. 2465-2471.

Akela Silverton et al., "Offset-variable density improves acoustic full-waveform inversion: a shallow marine case study," Geophysical Prospecting, 2016, vol. 64, pp. 1201-1214.

Albert Tarantola, "Inversion of seismic reflection data in the acoustic approximation," Geophysics, Aug. 1984, vol. 49, No. 8, pp. 1259-1266.

Bingbing Sun et al., "Pseudoelastic pure P-mode wave equation," Geophysics, Nov.-Dec. 2021, vol. 86, No. 6, pp. T469-T485.

C. H. Chapman et al., "Correcting an acoustic wavefield for elastic effects," Geophysical Journal International, 2014, vol. 197, pp. 1196-1214.

David Le Meur et al., "Adaptive attenuation of surface-wave noise," Sep. 2010, 2010 Eage www.firstbreak.org, first break vol. 28, pp. 83-88.

Denes Vigh et al., "Elastic full-waveform inversion application using multicomponent measurements of seismic data collection," Geophysics, Mar.-Apr. 2014, vol. 79, No. 2, pp. R63-R77.

Frank Press et al., "Propagation of Explosive Sound in a Liquid Layer Overlying a Semi-Infinite Elastic Solid," Presented at the St. Louis Meeting of the Society Mar. 1949, Contribution No. 11, Lamont Geological Observatory (Columbia University) Palisades, New York, pp. 426-446.

G. H. F. Gardner et al., "Formation Velocity and Density—The Diagnostic Basics for Stratigraphic Traps," Geophysics, Dec. 1974, vol. 39, No. 6, pp. 770-780.

J. O. A. Robertsson et al., "Effects of near-surface waveguides on shallow high-resolution seismic redaction and reflection data," Geophysical Research Letters, Mar. 1, 1996, vol. 23, No. 5, pp. 495-498.

J. Virieux et al., "An overview of full-waveform inversion in exploration geophysics," Geophysics, Nov.-Dec. 2009, vol. 74, No. 6, pp. WCC1-WCC1-WCC26.

James W. D. Hobro et al., "A method for correcting acoustic finite-difference amplitudes for elastic effects," Geophysics, Jul.-Aug. 2014, vol. 79, No. 4, pp. T243-T255.

Leon Thomsen, "Weak elastic anisotropy," Geophysics, Oct. 1986, vol. 51, No. 10, pp. 1954-1966.

Michael Warner et al., "Adaptive Waveform Inversion—FWI Without Cycle Skipping," SEG Full Waveform Inversion: Depth Model Building Workshop, 2015, pp. 11-14.

Oscar Calderon Agudo et al., "Acoustic full-waveform inversion in an elastic world," SEG International Exposition and 86th Annual Meeting, SEG 2016, pp. 1058-1062.

P. F. Daley et al., "Reflection and transmission coefficients for seismic waves in ellipsoidally anisotropic media," Geophysics, Jan. 1979, vol. 44, No. 1, pp. 27-38.

R. T. Shuey, "A simplification of the Zoeppritz equations," Geophysics, Apr. 1985, vol. 50, No. 4, pp. 609-614.

Rajesh Vayavur et al., "Mitigation of guided wave contamination in waveform tomography of marine seismic reflection data from southwestern Alaska," Geophysics, Jul.-Aug. 2016, vol. 81, No. 4, pp. B101-B118.

S. Hou et al., "Velocity Model Building with Guided Wave Inversion," 80th Eage Conference & Exhibition 2018, Jun. 11-14, 2018, Copenhagen, Denmark, 5 pages.

T.J. Sears et al., "Elastic full waveform inversion of multi-component OBC seismic data," Geophysical Prospecting, 2008, vol. 56, pp. 843-862.

W.A. Mulder et al., "Exploring some issues in acoustic full waveform inversion," Geophysical Prospecting, 2008, vol. 56, pp. 827-841.

Y. Luo et al., "Wave-equation traveltime inversion," Geophysics, May 1991, vol. 56, No. 5, pp. 645-653.

Yu Zhang et al., "A stable TTI reverse time migration and its implementation," Geophysics, May-Jun. 2011, vol. 76, No. 3, pp. WA3-WA11.

Zhigang Zhang et al., "Correcting for salt misinterpretation with full-waveform inversion," SEG International Exposition and 88th annual Meeting, SEG 2018, pp. 1143-1147.

Zongcai Feng et al., "True-amplitude linearized waveform inversion with the quasi-elastic wave equation," Geophysics, Nov.-Dec. 2019, vol. 84, No. 6, pp. R827-R844.

\* cited by examiner

FULL-WAVEFORM INVERSION WITH ELASTIC MITIGATION USING ACOUSTIC ANISOTROPY

TECHNICAL FIELD

Embodiments of the subject matter disclosed herein generally relate to seismic data processing using a full-waveform inversion technique, more specifically to using a pseudo-$\delta$ layer below the water-bottom to account for the difference between an acoustic and an elastic medium in the water-bottom reflections.

DISCUSSION OF THE BACKGROUND

In seismic surveys, sources (e.g., an airgun towed through water in a marine environment or a vibroseis truck for a land survey) emit waves that penetrate subsurface formations, being therein transmitted, reflected, refracted or diffracted at interfaces between layers with different elastic properties. Seismic sensors placed on top of the subsurface formations, in a borehole inside the subsurface formations, or in water, detect returning waves, which carry information about the geophysical properties of the subsurface formations. The seismic sensors record data as time series of sampled wave amplitudes. The recorded seismic data is processed to extract the information, for example, to generate structural models of the subsurface formations thus explored for presence and location of sought-after natural resources (hydrocarbons, geothermal water, minerals of interest, etc.).

Full-waveform inversion, FWI, is a technique (described, for example, in the 1984 article "Inversion of seismic reflection data in the acoustic approximation" by Tarantola A., published in *Geophysics*, Vol. 49(8), pp. 1259-1266, and the 2009 article "An overview of full-waveform inversion in exploration geophysics" by Virieux J. and Operto S., published in *Geophysics*, Vol. 74(6), pp. WCC1-26) for deriving high-resolution models of subsurface formations from seismic data. The models are three-dimensional maps of model parameters, for example, P- and S-wave velocity, attenuation, anisotropy, etc. FWI is a nonlinear inversion that determines values of one or more model parameters such that to minimize the misfit between seismic data acquired during a seismic survey and modeled data generated using a candidate (initial) model of the surveyed subsurface formation (the initial model being improved by the minimization). FWI may, for example, minimize an objective/cost function that measures the least-squares difference between the acquired data and the modeled data. The minimization may be pursued as an iterative approach (e.g., using gradient-descent algorithms) repeatedly updating the formation's model and then regenerating model data using the updated model. Once it converges, the resulting model is considered a true structural image of the explored subsurface formation because modeled data generated using this model is consistent with the observed data.

In FWI, generating simulated data involves tracking the seismic wave's path through the initial model of the underground formation using an appropriate wave equation. The wave equation represents the physics of the wave propagation including one or more of anisotropy, attenuation, elasticity, etc. according to the parameter values of the current formation's model. A realistic representation of the wave propagation in the real Earth is provided by the visco-elastic wave equation but using this equation is expensive from computational time and computational memory point of view. Various techniques have been developed to reduce the computational cost, for example, by performing a correction to the acoustic propagation, by designing matching filters to de-elastify the observed data, by deriving a quasi-elastic wave equation for single scattering only, by automatically attenuating the shear-waves during the propagation, etc. However, these techniques have been unable to effectively mitigate both the computational cost and algorithmic complexity. Therefore, in practice, FWIs frequently use an acoustic wave equation, which is simpler but yields less accurate results than the visco-elastic wave equation.

A computational acceptable approach is using the acoustic wave equation in FWI (i.e., acoustic FWI). The acoustic wave equation yields acoustic data, which, in comparison with real, observed, data, does not represent the amplitude versus angle (AVA) response of the reflectors correctly (for both pre- and post-critical incidence angle), lacks converted-waves or shear-waves, and forms an incorrect interference pattern for various wave phenomena.

These problems occur, for example, when considering guided-waves, which are defined by the interference pattern from pre- and post-critical angle water-bottom reflections, and their free-surface multiples, that bounce in the water column between the water bottom and the free surface. This interference pattern manifests itself as dispersive events in a cone of strong guided-wave energy on the recorded seismic shot gathers (in which the high-frequency components propagate at a speed close to the water velocity, and the low-frequency components propagate faster). The amplitude of the guided-waves is relatively stronger than other useful seismic events, for example, diving waves or reflections that experience 3D geometrical spreading during propagation, because guided-waves are trapped within the thin water column. Guided-waves cannot form below a specific frequency (known as "cut-off frequency") that is determined mainly by the water velocity and water bottom depth. Hence, the very lowest frequencies are free from guided-waves and they only appear in the seismic data above the cut-off frequency. For example, the cut-off frequency in shallow-water depths (i.e., less than 200 m) is ~6 Hz.

In theory, the guided-waves may provide velocity information on the water column and very shallow sediments. In practice, if acoustic wave propagation is used, then the acoustic and elastic wave-equation modeling having different reflection- and transmission-coefficient AVA (amplitude-versus-angle) behavior is problematic. Therefore, the strong amplitude guided-waves cause problems in acoustic FWI when the acquired data is believed to be elastic or visco-elastic in nature. While the free-surface behavior (i.e., the water-air boundary) is well-modeled by the acoustic approximation, the acoustic water bottom reflection is often stronger than the elastic one. This problem is due in part because the incident energy is converted to transmitted S-waves in an elastic medium, but there is no wave-mode conversion in an acoustic medium. Hence, the differences in the water bottom reflection behavior between acoustic and elastic modeling can give rise to completely different guided-wave modeling because the guided-waves are the interference pattern formed by a number of overlapping events. The differences between the acoustically modeled guided-waves and the observed data (elastic) guided-waves are present even if the correct models (with the correct P-wave velocity and density models honouring the correct water bottom depth) are used in the acoustic modeling.

The impact of mismatched guided-wave events may cause acoustic FWI updates to stall or give completely wrong results above the cut-off frequency because the guided-waves are often the strongest set of events on the seismic gathers and the acoustic FWI cannot improve the data agreement of the guided-waves without damaging the data agreement elsewhere. Many alternative objective/cost functions are available in FWI beyond the standard least-squares data difference. For example, an objective/cost function measuring the kinematic difference between modeled and observed data is less sensitive to the amplitude difference. In another example, an objective/cost function adjusts the model to make a matching filter between observed and modeled data conform to a specific form. The alternative objective/cost functions still cannot mitigate the guided-wave problem because the correct interference pattern is formed by the constructive/destructive interference of the different individual events, each event having an amplitude and phase behavior that differs depending on whether acoustic or elastic modeling was used. The guided-wave mismatch originates from the modeled data propagation, not when the observed and modeled data are compared.

Various techniques (e.g., selectively muting guided-waves, using dip filters to filter guided-waves out of observed and modeled data during FWI, applying matching filters to convert the observed data into a "pseudo-acoustic" dataset, using variable density models in FWI) have been employed in attempts to mitigate guided-waves (or general elastic) issues in seismic data processing, that can be applied to, or are an integral part of, an acoustic FWI process.

Returning to using elastic FWI instead of the acoustic FWI, the full elastic wave equations can accurately model all elastic effects of the subsurface. The results of elastic FWI are not biased by an imperfect modeling process and can reconstruct a more precise subsurface velocity model. Elastic FWI can update $V_p$, $V_s$ and density models, along with other parameters. In shallow water marine environments, pressure components, which are less sensitive to the $V_s$ model, may be used in an elastic FWI to update the $V_p$ model while maintaining other models fixed. The main drawback of elastic FWI is the prohibitive computational cost and algorithmic complexity associated with solving the elastic wave equation. The finite-difference method is customarily utilized to discretize the wave equation. The $V_s$ model, which varies relatively slower than the $V_p$ model, requires a much smaller spatial grid size to satisfy the frequency dispersion criteria required for accurate modeling. The smaller spatial grid size, in turn, decreases the time-step size to meet the wave propagation stability condition. Also, the elastic-wave equation involves more equations and variables than its acoustic version. All these factors combined result in the computational cost of elastic FWI being from ~5 times, to potentially more than 100 times, more expensive computationally, and in memory requirements, than the conventional acoustic FWI commonly used in most industrial applications (exactly how many times depends on the chosen elastic implementation and the $V_p V_s$ ratio). Furthermore, S-wave velocity information is commonly missing in most acquired seismic data, a constant (or simply varying) ratio being used to estimate $V_s$ model from the $V_p$ model. This overly-simplified approach causes errors in areas with complex structures.

It remains therefore of interest in seismic data processing for natural resource exploration in underground formation, to achieve more accurate images of the underground formations using FWI with reasonable/manageable computational costs.

SUMMARY

Methods and devices according to various embodiments perform an FWI of the seismic data using a model with a pseudo-δ layer to generate synthetic data. The presence of such a pseudo-δ layer provides an effective solution to handling the difference between acoustic and elastic media at the water bottom.

According to an embodiment, there is a seismic exploration method that includes obtaining seismic data acquired over an underground formation, performing an FWI of the seismic data using a model with a pseudo-δ layer to generate synthetic data, and locating sought-after natural resources in the underground formation using the model of the underground formation updated by the FWI. The FWI minimizes differences between the seismic data and the synthetic data.

According to another embodiment, there is seismic data processing apparatus having an interface configured to obtain seismic data acquired over an underground formation, and a processor. The processor is configured to perform an FWI of the seismic data using a model with a pseudo-δ layer to generate synthetic data, and to locate sought-after natural resources in the underground formation using the model of the underground formation updated by the FWI.

According to yet another embodiment, there is a computer readable recording medium storing executable codes that when executed by a computer make the computer perform a seismic exploration method. The method includes obtaining seismic data acquired over an underground formation, performing an FWI of the seismic data using a model with a pseudo-δ layer to generate synthetic data, and locating sought-after natural resources in the underground formation using the model of the underground formation updated by the FWI.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

In embodiments described in this section, the problems related to using acoustic FWI to process elastic seismic data are mitigated by using a model with a thin pseudo-$\delta$ layer under the water-bottom ($\delta$ being one of Thomsen's anisotropy parameters as described in the 1986 article "Weak elastic anisotropy" by Thomsen published in *Geophysics*, vol. 51(10), pp. 1954-1966).

As already introduced in the "Background" section, FWI minimizes an objective/cost function comparing acquired data with synthetic/simulated data generated using a model of the underground formation. The objective/cost function J used below for illustration is a least-square sum of corresponding sample-by-sample differences but other functions (e.g., based on the travel-time differences), may also be used. The technique described hereinafter (i.e., using a model with a thin pseudo-$\delta$ layer under the water-bottom) is valid regardless the choice of objective/cost function in FWI. The objective/cost function J is:

$$J = \sum_n \sum_k \sum_i \frac{1}{2}(S_n[k, i] - D_n[k, i])^2 \quad (1)$$

where S is the synthetic, or modeled, data, and D is the observed data. Here, n is the shot index (taking values 1, . . . N in case of N shot gathers), k is the receiver index for receivers detecting signals after a given shot, and i is the time sample index, each trace recorded by the receiver being made of sample values $D_n[k, i]$. The synthetic/simulated (or modeled) data S is obtained by sampling the forward modeled wavefield at the locations of the receivers.

In order to simplify the explanation without limiting validity of the technique for any type of anisotropy, the following discussion is limited to vertical transverse isotropy (VTI) as described by a specific wave equation. A VTI medium has physical properties that are symmetric about an axis that is normal to a plane of isotropy. The acoustic wave equation for the VTI medium (as set forth in the 2011 article "A stable TTI reverse time migration and its implementation," by Zhang et al., published in *Geophysics*, Vol. 76(3), pp. WA3-11) is:

$$\frac{1}{V_p^2}\frac{\partial^2}{\partial t^2}\binom{p}{r} - \begin{pmatrix} 1+2\epsilon & \sqrt{1+2\delta} \\ \sqrt{1+2\delta} & 1 \end{pmatrix} \quad (2)$$

$$\begin{pmatrix} \rho\frac{\partial}{\partial x}\left(\frac{1}{\rho}\frac{\partial}{\partial x}\right)+\rho\frac{\partial}{\partial y}\left(\frac{1}{\rho}\frac{\partial}{\partial y}\right) & 0 \\ 0 & \rho\frac{\partial}{\partial z}\left(\frac{1}{\rho}\frac{\partial}{\partial z}\right) \end{pmatrix}\binom{p}{r} = f$$

where $V_p$ is the P-wave velocity, $\rho$ is the density, p and r are equivalent horizontal and vertical stress components for VTI medium, ($\epsilon,\delta$) are the two Thomsen's anisotropic parameters and f is the external source term. The FWI may use a gradient-based algorithm to update the P-wave velocity model by minimizing the objective function in equation (1).

The gradient of the objective/cost function usable for the P-wave velocity update may be calculated using equations (1) and (2):

$$\frac{\partial J}{\partial V_p} = -\frac{2}{V_p^3}\int\left(\frac{\partial^2 p}{\partial t^2}\bar{p} + \frac{\partial^2 r}{\partial t^2}\bar{r}\right)dt \quad (3)$$

where $(\bar{p},\bar{r})$ are the backward propagated receiver-side wavefield, which is obtained by injecting the adjoint source term, which for the objective function in equation (1) is given by the difference between the modeled and observed data.

Once the gradient is formed, the velocity model $V_p^k$ is updated as $V_p^{k+1}$:

$$V_p^{k+1} = V_p^k - \alpha\frac{\partial J}{\partial V_p} \quad (4)$$

$\alpha$ being a step-size determined by, for example, a line-search method.

The anisotropy parameters in an acoustic modeling are used to mimic elastic behavior in the modeling. The guided-waves are employed hereinafter to simplify the discussion and describe an embodiment with a model including a thin pseudo-$\delta$ layer under the water-bottom, but their use is not intended to limit the applicability in FWI of using anisotropy parameters to mimic elastic behavior.

The mismatch of the guided-waves interference pattern is due to different AVA behavior of the water bottom reflection and its free surface multiples in an acoustic medium versus an elastic medium. This difference can be studied theoretically when comparing the general pre-critical AVA approximations for an isotropic elastic medium and for an acoustic medium. The AVA equation for an isotropic elastic medium is (as described in the 1985 article "A simplification of the Zoeppritz equations" by Shuey published in *Geophysics*, vol. 50(4) pp. 609-614):

$$R_{pp}^{iso}(\theta) = \frac{1}{2}\frac{\Delta Z}{Z} + \frac{1}{2}\left[\frac{\Delta V_p}{V_p} - \left(\frac{2\bar{V}_s}{\bar{V}_p}\right)^2\frac{\Delta G}{G}\right]\sin^2(\theta) + \frac{1}{2}\frac{\Delta V_p}{V_p}\sin^2(\theta)\tan^2(\theta) \quad (5)$$

where $\theta$ indicates the incidence angle, $Z=\rho V_p$ is the P-wave impedance, $\Delta Z$ is the P-wave impedance contrast across an interface and $$\overline{Z} = \frac{(Z_1 + Z_2)}{2}$$

is the average of the P-wave impedance across the interface. Similarly, $\overline{V}_p$ and $\Delta V_p$ are the average and contrast of the P-wave velocity across the interface, $\overline{V}_s$ and $\Delta V_s$ are the average and contrast of the S-wave velocity across the interface, and $G = \rho V_s^2$ is a term related to the density and S-wave velocity, $\Delta G$ is the contrast of G across an interface. For an acoustic medium, the S-wave velocity $V_s$ reduces to 0, and its AVA approximation is given as:

$$R_{pp}^{iso}(\theta) = \frac{1}{2}\frac{\Delta Z}{\overline{Z}} + \frac{1}{2}\frac{\Delta V_p}{\overline{V}_p}\sin^2(\theta) + \frac{1}{2}\frac{\Delta V_p}{\overline{V}_p}\sin^2(\theta)\tan^2(\theta) \quad (6)$$

By comparing equations (5) and (6), the elastic water bottom reflection differs to its counterpart in an acoustic medium (except for zero incidence angle). The difference is explained by the $$\text{term related} -\left(\frac{2\overline{V}_s}{\overline{V}_p}\right)^2 \frac{\Delta G}{\overline{G}}$$

which is related to the S-wave velocity. To compensate for the water bottom reflection difference, a VTI acoustic medium layer is used to mimic the true water bottom reflection. The general pre-critical AVA approximation for VTI acoustic medium is (as described in the 2002 book "Reflection coefficients and azimuthal AVO analysis in anisotropic media" by Rüger published by Society of Exploration Geophysicists):

$$R_{pp}^{VTI}(\theta) = \frac{1}{2}\frac{\Delta Z}{\overline{Z}} + \frac{1}{2}\left[\frac{\Delta V_p}{\overline{V}_p} + \Delta\delta\right]\sin^2(\theta) + \frac{1}{2}\left(\frac{\Delta V_p}{\overline{V}_p} + \Delta\epsilon\right)\sin^2(\theta)\tan^2(\theta) \quad (7)$$

where $\Delta\delta = \delta_2 - \delta_1$ is the change in Thomsen parameter $\delta$ across the interface, and $\Delta\epsilon = \epsilon_2 - \epsilon_1$ is the change in Thomsen parameter $\epsilon$ across the interface. Comparison of equations (5) and (7) shows that the pre-critical PP reflection in VTI acoustic medium is equal to that of an elastic medium if $$\Delta\delta = -\left(\frac{2\overline{V}_s}{\overline{V}_p}\right)^2 \frac{\Delta G}{\overline{G}} \text{ and } \Delta\epsilon = 0.$$

Commonly, the Thomsen anisotropic parameter delta ($\delta$) is zero in the water column. Therefore, a negative delta model for the sedimentary layer below the water bottom is required to reduce the difference between the pre-critical acoustic and elastic water-bottom reflections.

The interference pattern of the guided-waves is determined by both the pre-critical and post-critical water-bottom reflections. There is no simple equation that describes the post-critical AVA behavior for both VTI acoustic and elastic medium. Consider a two-layer model to illustrate the impact of the $\delta$ layer on the water-bottom PP reflection coefficients. The parameters of the two-layer model, which represents the water column and sediment layer below the seabed, are summarized below.

| | Vp (km/s) | Vs (km/s) | Density (g/cm$^3$) | $\delta$ | $\epsilon$ |
|---|---|---|---|---|---|
| Water column | 1.5 | 0.0 | 1.0 | 0 | 0 |
| Sediment | 2.0 | 0.6 | 1.8 | −0.275 | 0 |

Figure 1:
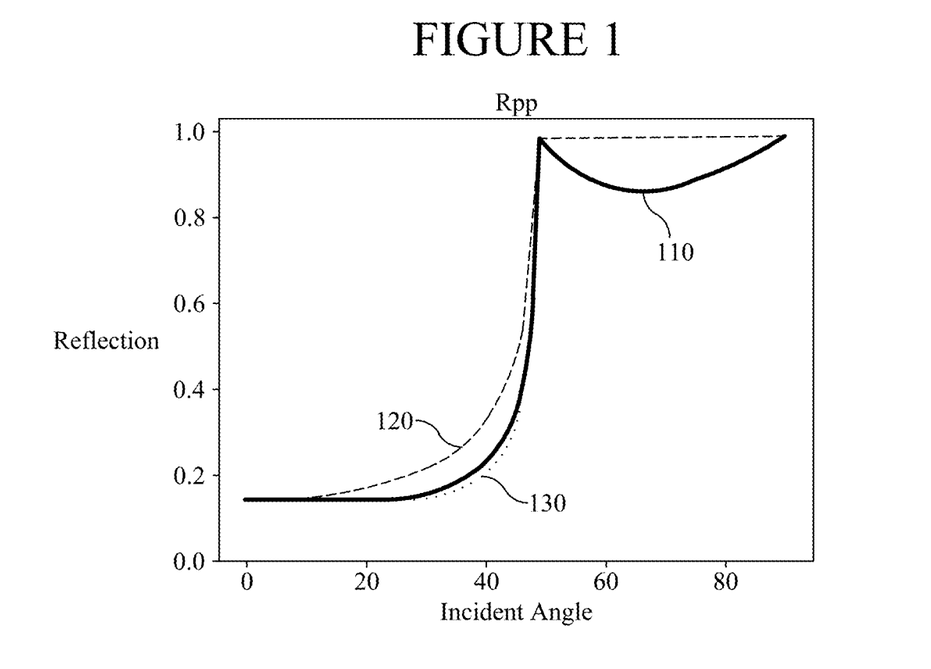
FIG. 1 is a graph of exemplarily illustrating the amplitude of the P-wave reflection coefficient, $R_{pp}$, as a function of the P-wave incident angle on the water bottom.
Figure 2:
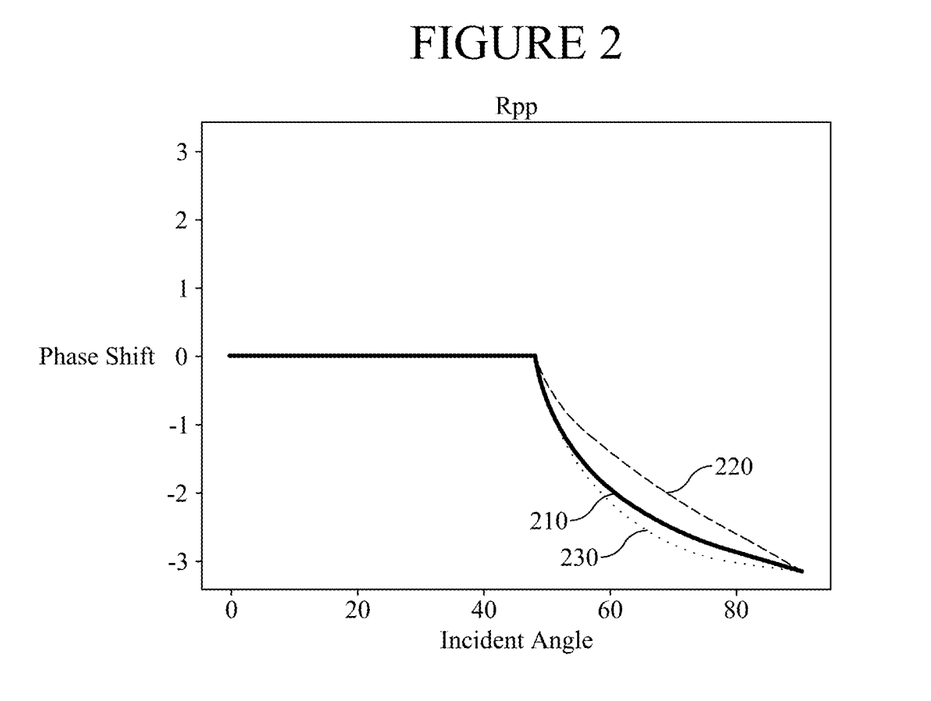
FIG. 2 is a graph of exemplarily illustrating the phase of the P-wave reflection coefficient, $R_{pp}$, as a function of the P-wave incident angle on the water bottom.

The exact reflection coefficients are computed by solving the Zoeppritz equation for an isotropic medium (as described in "Quantitative seismology" by Aki and Richard, published in 2002) and an anisotropic medium (as described in the 1979 article "Reflection and transmission coefficients for seismic waves in ellipsoidally anisotropic media" by Daley et al. published in *Geophysics* Vol. 44(1), pp. 27-38), respectively. As the reflection coefficients are complex numbers when the incidence angle is beyond the critical angle, the amplitude and phase term of the complex reflection coefficients are plotted separately in FIGS. 1 and 2. Thus, FIGS. 1 and 2 are graphs exemplarily illustrating the amplitude (a number between 0 and 1) and phase (in radians) of the reflection coefficient $R_{pp}$ as a function of the incidence angle (in °). The solid (110, 210), dashed (120, 220) and dotted (130, 230) curves indicate elastic, isotropic acoustic and VTI acoustic results, respectively. As visible in FIG. 1, both the pre-critical and post-critical acoustic (dashed curve) parts of the water bottom reflection are greater than the elastic reflection (solid curve) because the P-waves are converted into S-waves transmitted in an elastic medium, whereas the acoustic medium does not support wave-mode conversion. The VTI acoustic water bottom reflection (dotted curve) can reduce the amplitude of reflection coefficients to match the elastic reflection (solid curve) below the critical incidence angle. Beyond the critical incidence angle, the difference between acoustic and elastic reflection cannot be compensated by simply inserting a delta layer below the interface. In an acoustic medium, the amplitude of reflection coefficients is always equal to one (full reflection) beyond the critical angle, again because the acoustic medium does not support wave-mode conversion. The magnitude of elastic reflection coefficients is less than one because of wave-mode conversion. The phase term of the reflection coefficient (illustrated in FIG. 2) is a complex number beyond the critical incidence angle. Inserting a $\delta$-layer helps also to match the phase term of the elastic reflection coefficients. Even though the amplitude of post-critical reflection is not fixed by the $\delta$-layer, $\delta$-layer's presence is effective in modifying the interference pattern of acoustic guided-waves, potentially making them a good approximation to the observed (elastic) guided-waves.

Figure 3:
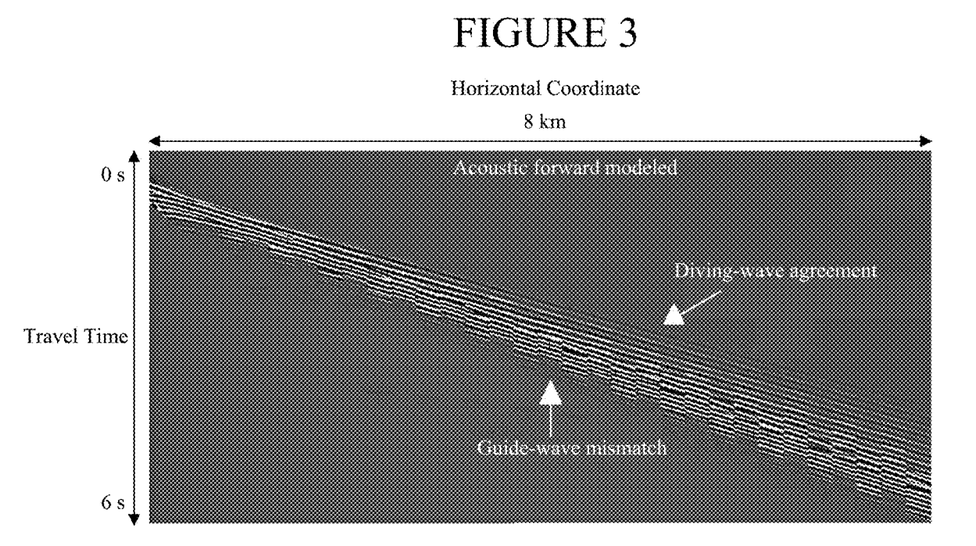
FIG. 3 exemplarily displays elastic and acoustic forward modeled traces using an initial model.

FIG. 3 illustrates a set of ten-traces displaying side-by-side (thus interleaved) acoustically and elastically modeled data generated with identical two-layer P-wave velocity and density models. The elastic forward modeling requires an S-wave velocity model. In this instance, it is obtained by setting the S-wave velocity for the water column to be zero and for the sediment to be a scaled version of the P-wave velocity, where the $V_p/V_s$ ratio is assumed to be 3. The mismatch is visible in the interference patterns of the guided-waves from FIG. 3.

Figure 4:
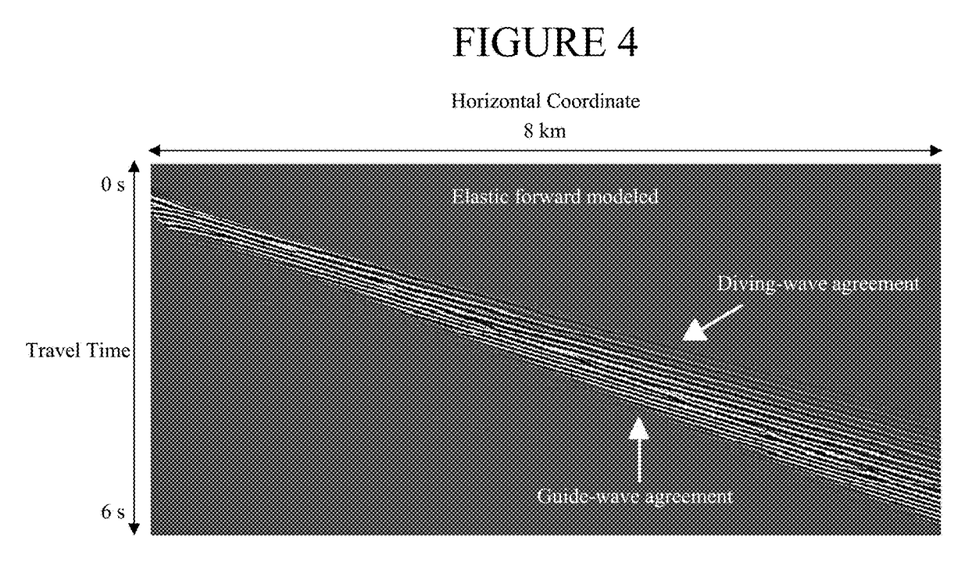
FIG. 4 exemplarily displays elastic and acoustic forward modeled traces using a model with a pseudo-δ layer.

FIG. 4 shows the same set of traces as in FIG. 3 but the original isotropic acoustic modeled data is replaced by data generated using an anisotropic acoustic wave equation with Thomsen anisotropy model parameter $\delta = -0.275$ for a sediment layer below the water bottom ($\delta = 0$ for the water column). The Thomsen anisotropy model parameter $\epsilon$ is zero everywhere. This anisotropic model yields the guided-wave events nicely matched with the observed (elastic) guided-waves events. Note that this pseudo-δ layer is not a physical reality indicating true anisotropic properties of the subsurface formation. This pseudo-δ layer is just component of a model and it is used for reducing the water bottom reflection difference between acoustic and elastic medium.

Moving now away from the guided-wave-related description more generally using anisotropy parameters in acoustic modeling as a way to mimic elastic behavior, two problems need to be answered when applying this strategy to real, or observed, data in FWI. First, when the true P-wave velocity, S-wave velocity and density model are unknown, it cannot be determined the best value for the pseudo-δ model that mimics the elasticity based on the equation:

$$\delta = -\left(\frac{2\overline{V}_s}{\overline{V}_p}\right)^2 \frac{\Delta G}{G} \quad (8)$$

Second, a pseudo-δ layer introduces a bias on the kinematics of the wavefield propagation. The first problem can be addressed by inverting for model with a pseudo-δ layer that gives the best match between the acoustic and elastic phenomena of interest (guided waves or other waves). The second problem can be mitigated by: (1) combining the pseudo-δ layer with the underlying anisotropy model, (2) maintaining the pseudo-δ updates on a small (micro) length scale, such that their accumulated behavior and impact on the wavefield propagation over a larger (macro) scale is not altered too much, and/or (3) adjusting the observed data to compensate for any resulting kinematic bias caused by the pseudo-δ layer.

Using again the guided-waves to simplify the description (although the use of guided-waves is not intended to be limiting and other waves may be used), the S-wave velocity at the water-bottom may be estimated based on an assumed $V_p/V_s$ ratio and the initial $V_p$ model, while the density model may be estimated using the empirical Gardner's equation (set forth in the 1974 article "Formation velocity and density—The diagnostic basics for stratigraphic traps" by Gardner et al. published in *Geophysics*, Vol. 39(6), pp. 770-780). An initial guess of the pseudo-δ layer may then be obtained using equation (8) with these estimates. This initial guess can be added to any existing (genuine) δ model that is being used to describe real anisotropy. Then, VTI acoustic FWI is performed to update the δ model by fitting the guided-waves only. For example, using equations (1) and (2), the gradient for the δ model update is:

$$\frac{\partial J}{\partial \delta} = -\frac{1}{\sqrt{1+2\delta}} \int_0^T \rho \frac{\partial}{\partial z}\left(\frac{1}{\rho}\frac{\partial r}{\partial z}\right)\overline{p} + \left(\rho\frac{\partial}{\partial x}\left(\frac{1}{\rho}\frac{\partial p}{\partial x}\right) + \rho\frac{\partial}{\partial y}\left(\frac{1}{\rho}\frac{\partial p}{\partial y}\right)\right)\overline{r}dt \quad (9)$$

The updated pseudo-δ layer that matches the interference pattern of guided-waves may then be edited to the inverted pseudo-δ layer to reduce its bias on the kinematics of wavefield propagation. Based on our tests, a thin layer (<100 m) of negative δ below the water bottom is enough to solve the guided-wave mismatches. This editing process can also be incorporated into the inversion directly as a mask, or indirectly as a constraint.

Next, an acoustic FWI may be used to update the P-wave velocity model with this updated and edited model including the pseudo-δ layer being used as the initial model for this second inversion.

Figure 5:
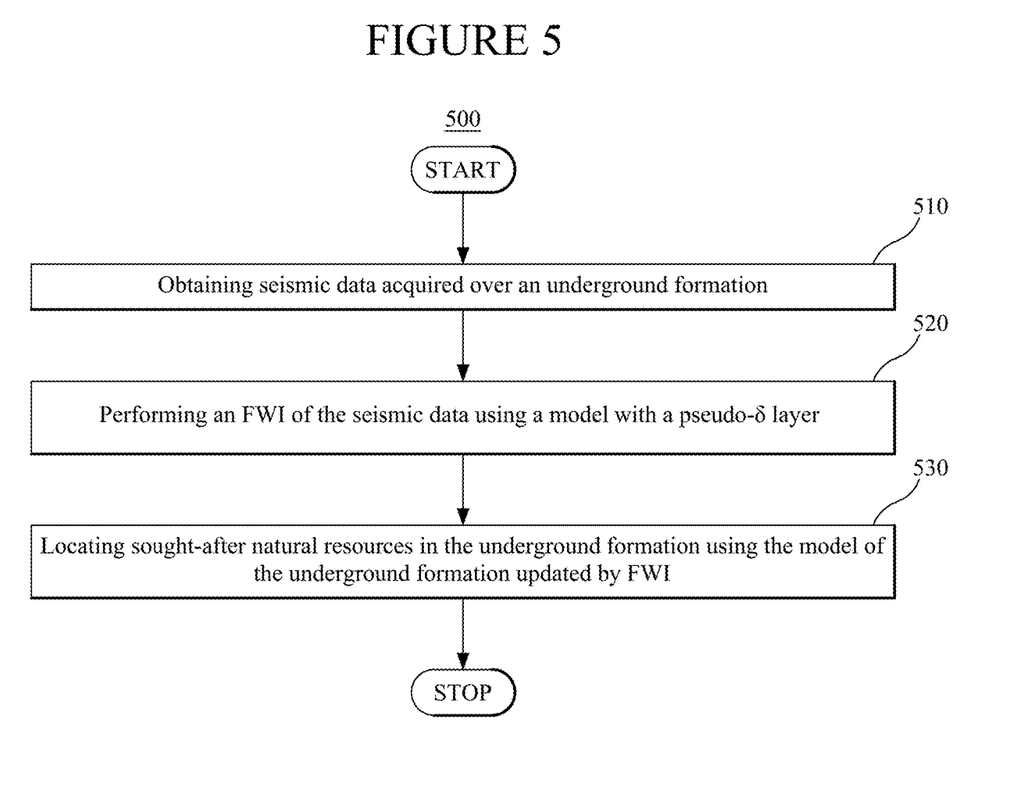
FIG. 5 is a flowchart of a seismic data processing method according to an embodiment.

FIG. 5 is flowchart of a seismic exploration method 500 according to an embodiment. Method 500 includes obtaining seismic data acquired over an underground formation at 510. Regardless of seismic data being directly acquired or retrieved from a data storage unit, the seismic data is real, observed data.

Method 500 further includes performing a FWI of the seismic data using a model with a pseudo-δ layer to generate synthetic data at 520. As already discussed, the FWI updates the model to minimize differences between the seismic data and the synthetic data. The FWI, which may be an acoustic FWI or an elastic FWI, may be performed multiple times (e.g., a predetermined number of times or until a convergence criterion is met).

Method 500 then includes, at 530, locating sought-after natural resources (e.g., hydrocarbons, minerals of interest, geothermal water, etc.) in the underground formation using the model updated by the FWI. The model(s) of the P-wave velocity, the S-wave velocity and/or other attributes obtained via FWI enable identifying the nature (rock, sediments minerals, hydrocarbons, water, etc.) of various volumes in the underground formation, thereby locating sought-after natural resources.

The pseudo-δ layer may be less than 100 m thick and/or may be located directly underneath the water bottom. The pseudo-δ layer may be determined to cause guided-waves in the synthetic data to match guided-waves in the seismic data (i.e., the FWI minimizes data difference for the guided waves). The model used by the FWI to generate the synthetic data may be produced using one or more initial maps of P-wave velocity, density, S-wave velocity and P-velocity to S-velocity ratio.

The method may further include editing the updated model of the underground formation to reduce changes in wave kinematics due to the pseudo-δ layer and performing an acoustic FWI using the edited model to obtain the model used for locating the sought-after natural resources. As previously discussed, the pseudo-δ layer may have a negative value for δ and a null value for ε (δ and ε being Thomsen's anisotropy parameters). In one embodiment the FWI is an acoustic FWI.

To exemplify the effectiveness of using a pseudo-δ layer below the water-bottom to account for the difference between an acoustic and an elastic medium in the water-bottom reflections, consider an underground formation whose $V_p$ model perturbations from a simple background velocity behavior are illustrated as nuances of gray in FIG. 6 (for a 15 km horizontal range and a 3 km depth range). A first Gaussian anomaly 610 increases the $V_p$ values and a second anomaly 620 decreases the $V_p$ values.

Figure 6:
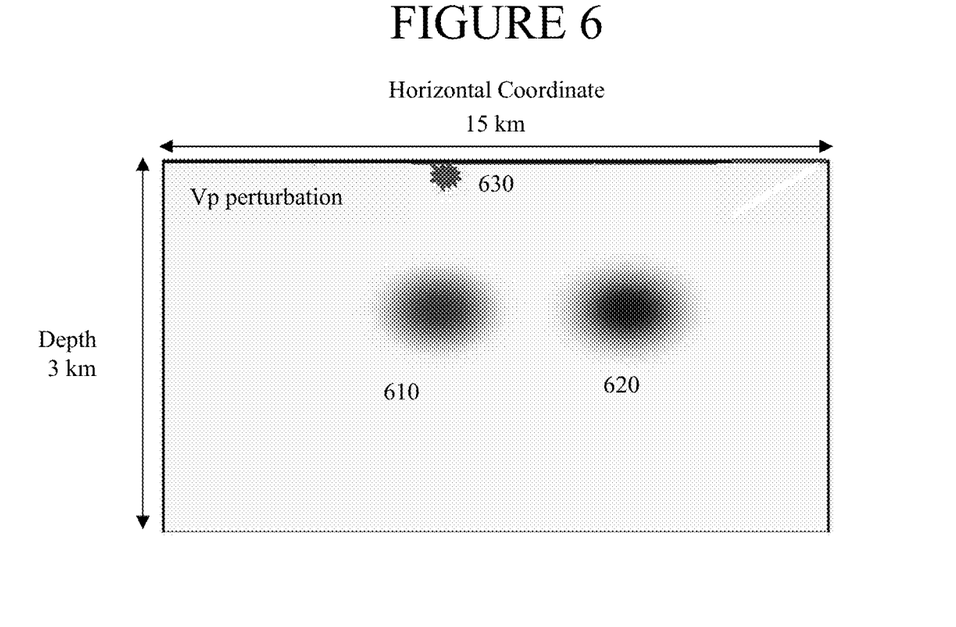
FIG. 6 illustrates the perturbation applied to a underground formation's $V_p$ model used for testing.
Figure 7:
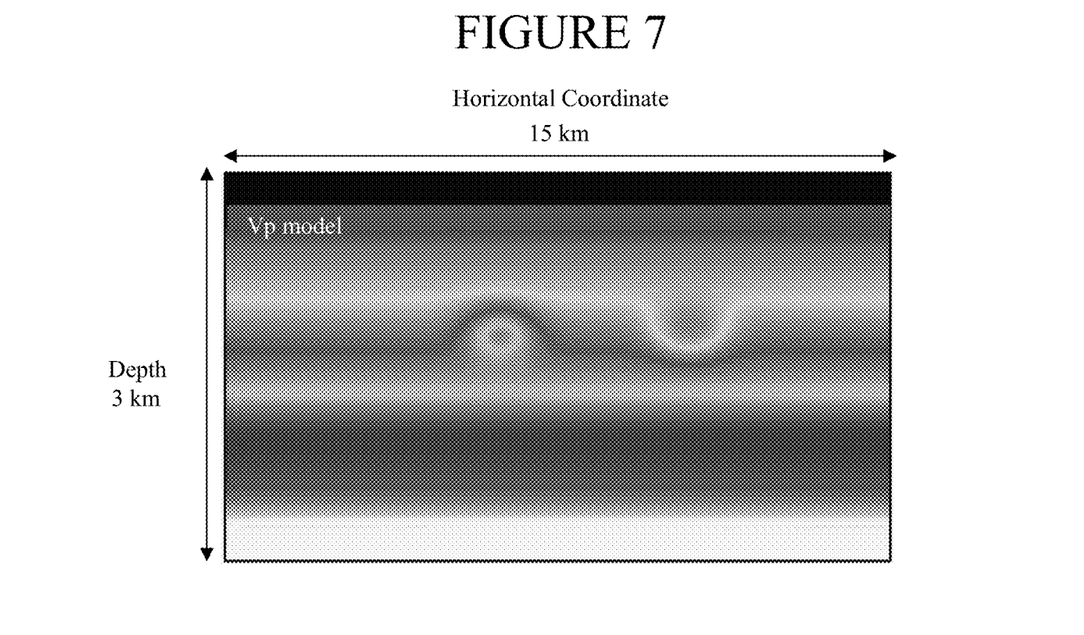
FIG. 7 illustrates a perturbed underground formation's $V_p$ model used for testing.

FIG. 7 illustrates the perturbed underground formation's $V_p$ model for the same horizontal and depth ranges as FIG. 6; this model is used for testing validity of the above-described methods using a model with thin layer. In FIG. 7, the Gaussian anomaly perturbations of FIG. 6 overlap the simple background velocity with values of 1500 m/s (in water) to 3000 m/s at 3 km depth (represented as nuances of gray).

Figure 8:
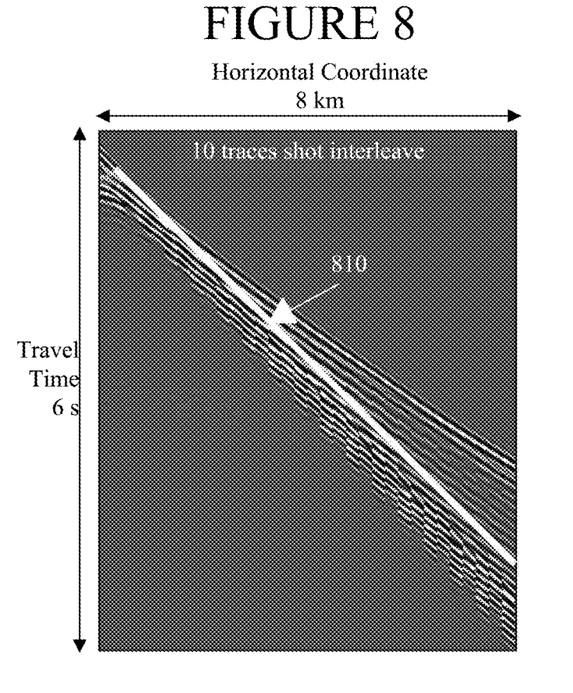
FIG. 8 illustrates a set of ten traces acoustically and elastically modeled using the model in FIG. 7.

FIG. 8 represents a set of ten synthetic traces being displayed as in FIG. 3 by interleaving acoustically and elastically modeled data generated using the velocity model in FIG. 7. The elastically modeled synthetic data correspond to real data that would have been acquired over an underground formation having the $V_p$ velocity illustrated in FIG. 7. The S-wave velocity model (not shown) is a two-layer model, $V_s$ being zero for the water column and a constant value (600 m/s) for sediments below water bottom. The synthetic data is generated using a Ricker wavelet with an 8 Hz peak frequency. Line 810 in FIG. 8 indicates the approximate location of the water-bottom moveout, so the interference pattern of the guided-wave appears below the white line. The first arrivals (above line 810) are well-matched for acoustically and elastically modeled data, but the interference of guided-waves (below line 810) is not aligned because of the water-bottom reflection difference between acoustic and elastic modeling.

The method in which FWI uses a model with a pseudo-$\delta$ layer is validated if able to retrieve the perturbations when applied to update the background model without the perturbations. In other words, FWI minimizes the difference between synthetic data acoustically generated using the background model without the perturbations but including the pseudo-$\delta$ layer, and the data elastically generated using the model in FIG. 7.

Figure 9:
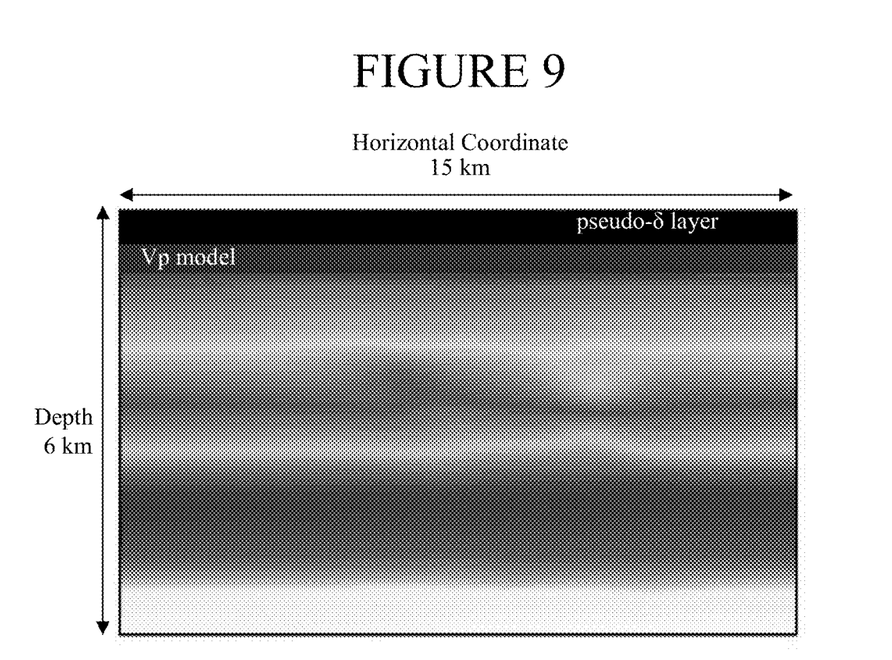
FIG. 9 illustrates the underground formation's $V_p$ model obtained using a seismic data processing method according to an embodiment.
Figure 10:
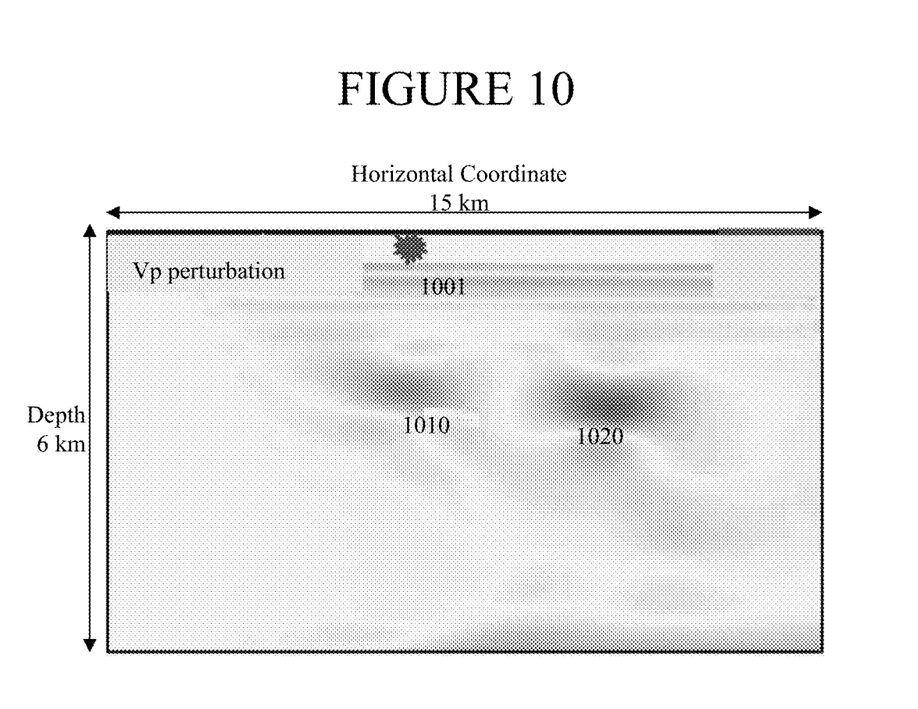
FIG. 10 illustrates the perturbations of the background $V_p$ model retrieved using a seismic data processing method according to an embodiment.

FIG. 9 illustrates the $V_p$ model obtained by applying a method such as method 500 to the elastically modeled synthetic data generated using the $V_p$ velocity illustrated in FIG. 7, the FWI using as initial model (for acoustically generating synthetic data) the background $V_p$ model without the perturbations. FIG. 10 illustrates the perturbations 1010 and 1020 corresponding to 610 and 620) retrieved by extracting the initial $V_p$ (background) model from $V_p$ model in FIG. 9.

Figure 11:
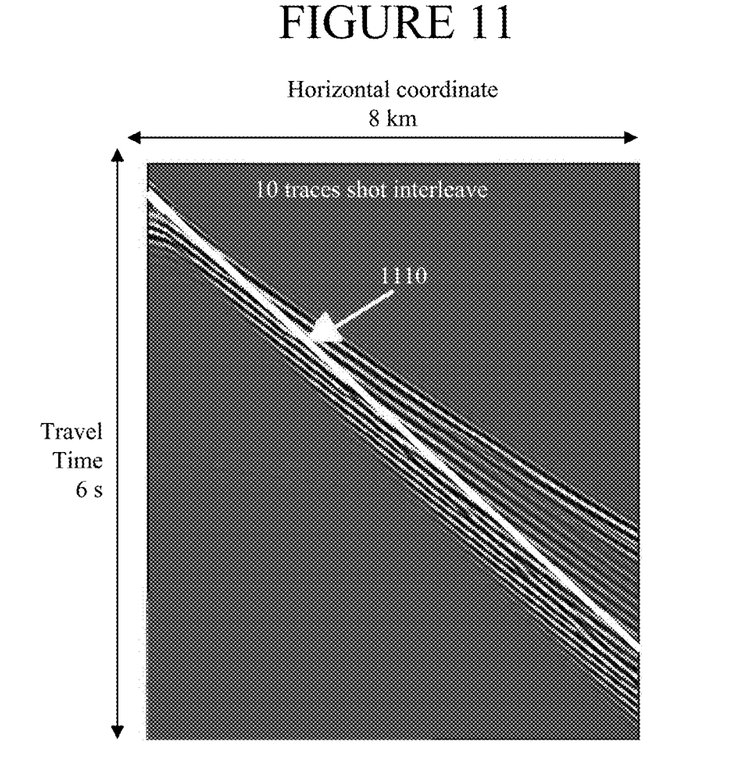
FIG. 11 illustrates a set of ten traces acoustically and elastically modeled using the model in FIG. 9.
Figure 12:
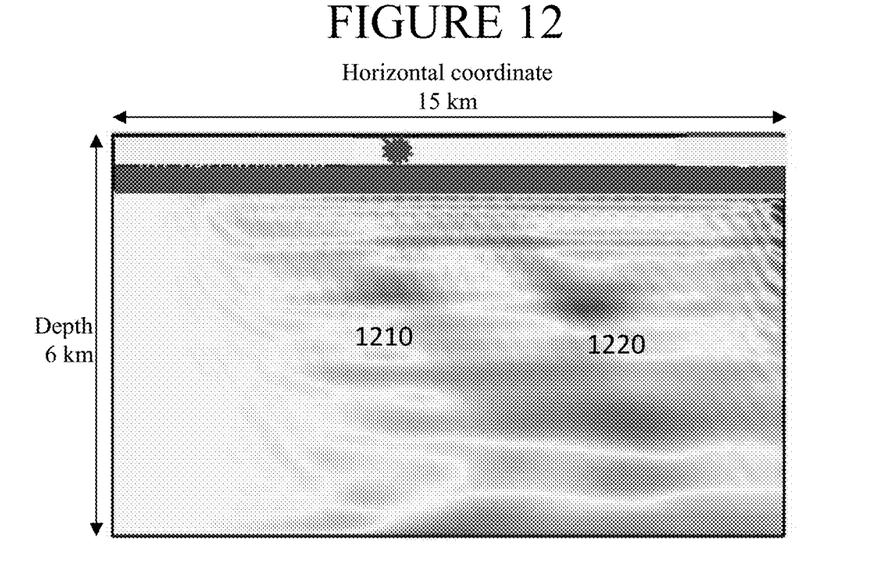
FIG. 12 illustrates the perturbations of the background $V_p$ model retrieved using a conventional acoustic FWI method.
Figure 13:
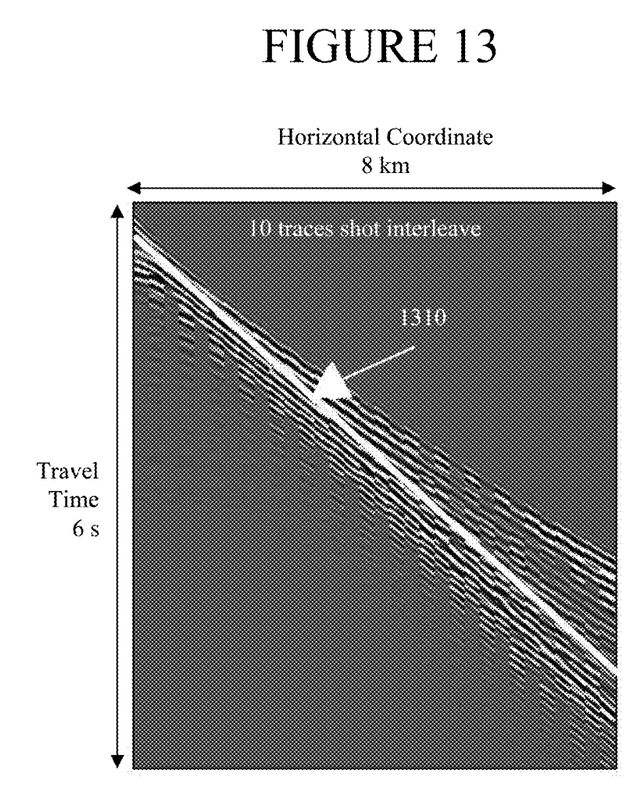
FIG. 13 illustrates a set of ten traces acoustically and elastically modeled using the $V_p$ model obtained using a conventional acoustic FWI method.

FIG. 11 illustrates a set of ten synthetic traces being displayed as in FIG. 8 (i.e., interleaving acoustically and elastically modeled data) generated using the velocity model in FIG. 9. These results are a substantial improvement relative to results obtained from FWI using a model without the pseudo-$\delta$ layer. The results obtained from a conventional acoustic FWI without using the pseudo-$\delta$ layer are illustrated in FIGS. 12 and 13 that represent the perturbations and the traces as in FIGS. 10 and 11 respectively. The perturbations retrieved in FIG. 10 (i.e., 1010 and 1020) are less contaminated by artefacts than the ones (i.e., 1210 and 1220) in FIG. 12. The data match for elastically and acoustically generated data illustrated in FIG. 11, both above and below line 1110 is substantially better than the data match in FIG. 13 above and below line 1310 (lines 1110 and 1310 being similar to line 810).

Figure 14:
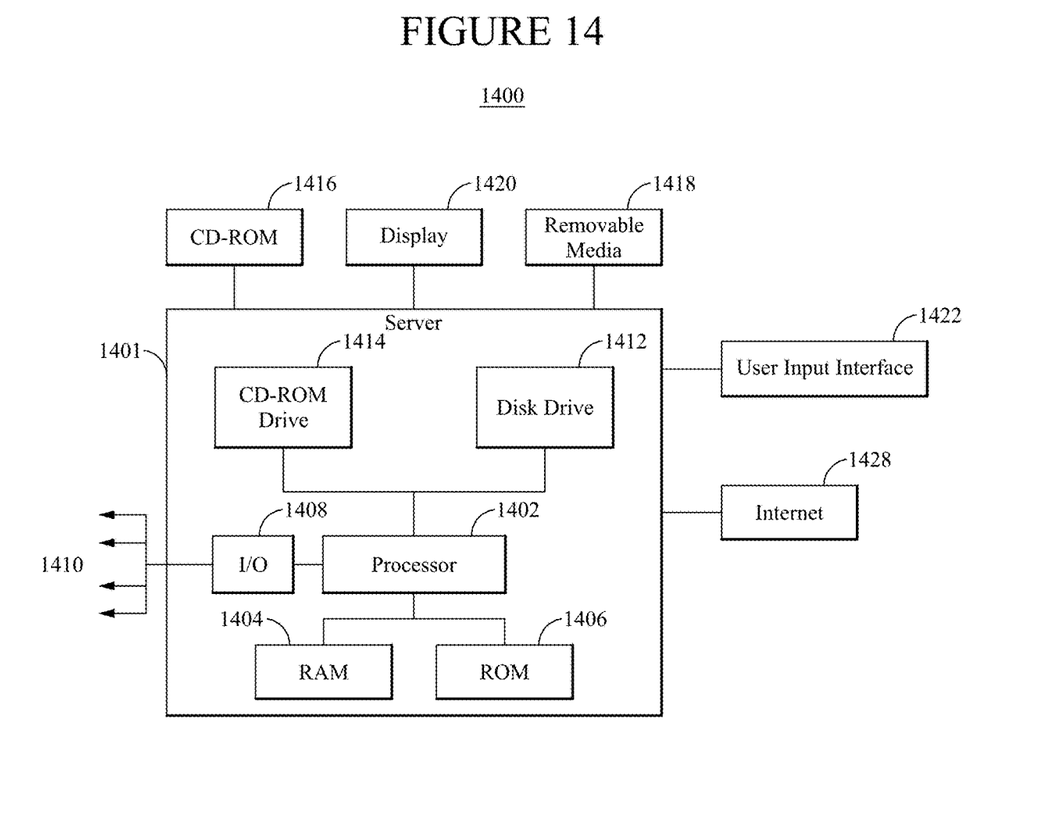
FIG. 14 is a block diagram of a seismic data processing apparatus, according to an embodiment.

The above-discussed methods may be implemented in a computing device 1400 as illustrated in FIG. 14. Hardware, firmware, software or a combination thereof may be used to perform the various steps and operations of the above-described methods/techniques.

Computing device 1400 suitable for performing the activities described in the exemplary embodiments may include a server 1401. Server 1401 may include a central processor (CPU or GPU) 1402 coupled to a random-access memory (RAM) 1404 and to a read-only memory (ROM) 1406. ROM 1406 may also be other types of storage media to store programs, such as programmable ROM (PROM), erasable PROM (EPROM), etc.

Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions. The processor is configured to perform a full-waveform inversion, FWI, of the seismic data using a model with a pseudo-$\delta$ layer to generate synthetic data, the FWI updating the model to minimize differences between the seismic data and the synthetic data, and to locate sought-after natural resources in the underground formation using the model of the underground formation as updated by the FWI.

The processor may also be configured to determine the pseudo-$\delta$ such as guided-waves in the synthetic data to match guided-waves in the seismic data. In one embodiment the processor is further configured to produce the model used to generate the synthetic data using one or more initial maps of P-wave velocity, density, S-wave velocity and P-wave velocity to S-wave velocity ratio. The processor may further be configured to edit the model of the underground formation to reduce changes in wave kinematics caused by the pseudo-$\delta$ layer, and to perform an acoustic FWI using the edited model to obtain the model used for locating the sought-after natural resources.

RAM 1404 may be configured to store executable codes that when executed by a computer make the computer perform a seismic exploration method such as method 500 and its variations described in this section.

Server 1401 may also include one or more data storage devices, including hard drives 1412, CD-ROM drives 1416 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as sources, detectors, etc. The server may be part of a larger network configuration as in a global area network such as the Internet 1428, which allows ultimate connection to various computing devices.

The methods and devices set forth in this section (using a model with a pseudo-$\delta$ layer to generate synthetic data for FWI) overcome the problems observed in the prior art. These problems are briefly recapitulated. (1) If relying on muting the events that are not well-modeled acoustically (for example, guided-waves) the useful signals is altered as well (e.g., diving-waves and reflections overlap with guided-wave events in the time-space domain), and separate muting curves (that may take a large amount of time and effort to pick, especially for the survey areas where the data varies rapidly) have to be provided for the various events of interest. (2) Similar drawbacks (i.e., damage useful seismic events and tedious determination of the dip filter parameters) occur if dip filters are applied to modeled and observed data during the internal iterations of FWI. (3) If using matching filters to map observed (elastic) data to the acoustic domain, it is assumed that the elastic effects can be captured by convolutional filters estimated by minimizing the difference between modeled acoustic and elastic data. However, the elastic forward modeling can incur a significant amount of extra computational cost and when generating elastic data, the S-wave velocity is generally estimated by scaling the P-wave velocity via a constant $V_p/V_s$ ratio. If the true S-wave velocity varies significantly from the scaled P-wave velocity, this scaling potentially leads to the failure, or bias, of the matching filter. (4) If assigning a non-physical offset-variable density model to the water column in order to approximate elastic guided-waves by changing the water-bottom reflection, the density model cannot compensate for the impacts of S-wave velocity on the AVA behavior of water bottom reflection. There is no physical law to guide the selection of density models, which are commonly determined by many trials. (5) Elastic FWI can solve the guided-wave issues as it has the correct water-bottom reflection behavior, but it has huge computational cost, especially when the inversion is performed on a high-frequency band (which requires a small spatial grid size and time step size to satisfy the frequency dispersion and stable conditions of the finite difference technique).

The embodiments described in this section with a pseudo-δ layer below the water-bottom handles the water-bottom reflection difference between acoustic and elastic media without applying a mute or dip filter to remove the strong amplitude guided-wave events from the observed data, all useful signals being kept for inversion avoiding the problems of conventional approaches (1) and (2). No matching filter as in (3) is employed to map the elastic guided-wave events to the corresponding acoustic ones. The pseudo-δ layer mimics the interference pattern of guided-waves. The theoretical analysis of the amplitude-versus-azimuth (AVA) behavior of water-bottom reflections shows that unlike (4), the pseudo-δ layer can compensate the amplitude of pre-critical reflection and the phase-shift of post-critical reflection. Last but not least, the computational cost when using this embodiment is equivalent to the cost of two acoustic FWI—one for updating the model including the pseudo-δ layer (which can be limited to a near-surface update only to further reduce computational cost) and the other one is for P-wave velocity updating using the conventional acoustic FWI method. The total computational cost is much lower than elastic FWI.

The embodiments described in this section set forth seismic data processing using FWI and a model with a thin pseudo-δ layer below the water-bottom to account for the difference between an acoustic and an elastic medium in the water-bottom reflections. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A seismic exploration method, the method comprising:
   obtaining seismic data acquired over an underground formation covered by a water layer;
   performing a full-waveform inversion, FWI, of the seismic data using a model with a pseudo-δ layer located directly underneath the water layer to generate synthetic data, the FWI updating the model to minimize differences between the seismic data and the synthetic data; and
   locating sought-after natural resources in the underground formation using the model of the underground formation updated by the FWI.

2. The method of claim 1, wherein the pseudo-δ layer is less than 100 m thick.

3. The method of claim 1, wherein the pseudo-δ layer is determined such as to match guided-waves in the synthetic data to guided-waves in the seismic data.

4. The method of claim 1, further comprising:
   producing the model used to generate the synthetic data using one or more initial maps of P-wave velocity, density, S-wave velocity and P-wave velocity to S-wave velocity ratio.

5. The method of claim 1, further comprising:
   editing the model of the underground formation to reduce changes in wave kinematics due to the pseudo-δ layer; and
   performing an acoustic FWI using the edited model to obtain the model used for locating the sought-after natural resources.

6. The method of claim 1, wherein the pseudo-δ layer has a negative value for δ and a null value for ε.

7. The method of claim 1, wherein the FWI is an acoustic FWI.

8. The method of claim 1, wherein the model includes one or more maps of P-wave velocity, S-wave velocity, anisotropy, and attenuation.

9. A seismic data processing apparatus comprising:
   an interface configured to obtain seismic data acquired over an underground formation covered by a water layer; and
   a processor configured
   to perform a full-waveform inversion, FWI, of the seismic data using a model with a pseudo-δ layer located directly underneath the water layer to generate synthetic data, the FWI updating the model to minimize differences between the seismic data and the synthetic data, and
   to locate sought-after natural resources in the underground formation using the model of the underground formation as updated by the FWI.

10. The seismic data processing apparatus of claim 9, wherein the pseudo-δ layer is less than 100 m thick.

11. The seismic data processing apparatus of claim 9, wherein the processor is configured to determine the pseudo-δ layer such as to match guided-waves in the synthetic data to guided-waves in the seismic data.

12. The seismic data processing apparatus of claim 9, wherein the processor is further configured:
   to produce the model used to generate the synthetic data using one or more initial maps of P-wave velocity, density, S-wave velocity and P-wave velocity to S-wave velocity ratio.

13. The seismic data processing apparatus of claim 9, wherein the processor is further configured:
   to edit the model of the underground formation to reduce changes in wave kinematics caused by the pseudo-δ layer; and
   to perform an acoustic FWI using the edited model to obtain the model used for locating the sought-after natural resources.

14. The seismic data processing apparatus of claim 9, wherein the pseudo-δ layer has a negative value for δ and a null value for E.

15. The seismic data processing apparatus of claim 9, wherein the FWI is an acoustic FWI.

16. The seismic data processing apparatus of claim 9, wherein the model includes one or more of P-wave velocity, S-wave velocity, anisotropy, and attenuation.

17. A computer readable recording medium storing executable codes that when executed by a computer make the computer perform a seismic exploration method, the method comprising:
- obtaining seismic data acquired over an underground formation covered by a water layer;
- performing a full-waveform inversion, FWI, of the seismic data using a model with a pseudo-δ layer located directly underneath the water layer to generate synthetic data, the FWI updating the model to minimize differences between the seismic data and the synthetic data; and
- locating sought-after natural resources in the underground formation using the model of the underground formation updated by the FWI.

18. The computer readable recording medium of claim 17, wherein the pseudo-δ layer is less than 100 m thick and/or is determined to match guided-waves in the synthetic data to guided-waves in the seismic data.

\* \* \* \* \*